US007412404B1

(12) United States Patent
Tenorio

(10) Patent No.: US 7,412,404 B1
(45) Date of Patent: Aug. 12, 2008

(54) GENERATING, UPDATING, AND MANAGING MULTI-TAXONOMY ENVIRONMENTS

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 532 days.

(21) Appl. No.: 10/032,903

(22) Filed: Oct. 19, 2001

Related U.S. Application Data

(60) Provisional application No. 60/326,063, filed on Sep. 27, 2001.

(51) Int. Cl.
*G06Q 99/00* (2006.01)
(52) U.S. Cl. .............................. 705/14; 715/236; 707/8
(58) Field of Classification Search ................. 707/104, 707/1–6, 100–103, 8; 705/2–10, 26–29, 705/35; 715/505, 236
See application file for complete search history.

(56) References Cited

U.S. PATENT DOCUMENTS

| | | | | |
|---|---|---|---|---|
| 5,132,900 | A | | 7/1992 | Gilchrist et al. ............. 364/419 |
| 5,379,340 | A | * | 1/1995 | Overend et al. .......... 379/93.24 |
| 5,675,791 | A | | 10/1997 | Bhide et al. .................. 395/621 |
| 5,812,995 | A | | 9/1998 | Sasaki et al. .................... 707/1 |
| 5,890,175 | A | * | 3/1999 | Wong et al. .................. 715/505 |
| 5,920,873 | A | * | 7/1999 | Van Huben et al. .......... 707/202 |
| 5,987,506 | A | * | 11/1999 | Carter et al. ................. 709/213 |
| 6,014,644 | A | | 1/2000 | Erickson ....................... 705/37 |
| 6,026,381 | A | * | 2/2000 | Barton et al. .................. 705/35 |
| 6,035,297 | A | | 3/2000 | Van Huben et al. ............. 707/8 |
| 6,088,693 | A | * | 7/2000 | Van Huben et al. ............. 707/8 |
| 6,088,717 | A | | 7/2000 | Reed et al. ................... 709/201 |
| 6,092,121 | A | | 7/2000 | Bennett et al. ............... 709/250 |

(Continued)

FOREIGN PATENT DOCUMENTS

EP    1 056 024 A1    11/2000

(Continued)

OTHER PUBLICATIONS

Stephen Brown, Micro-scale retail loaction: Conderella or ugly sister?, 1993, International Journal of Retail & Management, v21n7, p. 10-19.*

(Continued)

*Primary Examiner*—James P. Trammell
*Assistant Examiner*—Behrang Badii
(74) *Attorney, Agent, or Firm*—Booth Udall, PLC

(57) ABSTRACT

An electronic commerce system includes one or more databases operable to store product data for one or more products. The system also includes a master global content directory that includes a plurality of product classes organized in a hierarchy, the product class categorizing the products and associated with one or more attributes of the products. At least one of the product classes has one or more associated product pointers that identify one or more of the databases. The system further includes one or more secondary content directories including one or more classes mapping back to the product classes in the master global content directory and the classes having associated class pointers that identify product classes in the master global content directory. The system also includes a search interface that communicates a search query to one or more of the databases to search product data.

22 Claims, 4 Drawing Sheets

U.S. PATENT DOCUMENTS

| | | | | |
|---|---|---|---|---|
| 6,094,654 | A * | 7/2000 | Van Huben et al. | 707/8 |
| 6,226,675 | B1 | 5/2001 | Meltzer et al. | 709/223 |
| 6,253,188 | B1 | 6/2001 | Witek et al. | 705/14 |
| 6,269,361 | B1 * | 7/2001 | Davis et al. | 707/3 |
| 6,275,933 | B1 | 8/2001 | Fine et al. | 713/2 |
| 6,397,231 | B1 | 5/2002 | Salisbury et al. | 707/515 |
| 6,442,574 | B1 | 8/2002 | Schumacher et al. | 707/501 |
| 6,473,791 | B1 | 10/2002 | Al-Chosein et al. | 709/217 |
| 6,484,143 | B1 | 11/2002 | Swildens et al. | 705/1 |
| 6,560,620 | B1 | 5/2003 | Ching | 707/511 |
| 6,778,991 | B2 | 8/2004 | Tenorio | 707/10 |
| 2001/0020240 | A1 * | 9/2001 | Classen | 707/104.1 |
| 2001/0049675 | A1 | 12/2001 | Mandler et al. | 707/1 |
| 2002/0013827 | A1 | 1/2002 | Edstrom et al. | 709/219 |
| 2002/0095301 | A1 | 7/2002 | Villena | 705/1 |
| 2002/0147656 | A1 | 10/2002 | Tam et al. | 705/26 |
| 2003/0050958 | A1 | 3/2003 | Keller et al. | 709/201 |
| 2003/0130905 | A1 * | 7/2003 | Foster et al. | 705/26 |

FOREIGN PATENT DOCUMENTS

| | | |
|---|---|---|
| JP | 04352068 A | 12/1992 |
| WO | WO 200155886 A2 * | 8/2001 |
| WO | WO 200161433 A2 * | 8/2001 |

OTHER PUBLICATIONS

Carey, et al. "Load Balancing in a Locally Distributed Database System," © 1986 *ACM* 0-89791-191-1/86/0500/0108 (pp. 108-119), 1986.

"Oracle® e-Commerce Gateway" User's Guide, Release 11i.2, Aug. 2000, Part No. A75089-02.

* cited by examiner

GENERATING, UPDATING, AND MANAGING MULTI-TAXONOMY ENVIRONMENTS

RELATED APPLICATIONS

This patent application claims priority to U.S. provisional patent application U.S. Ser. No. 60/326,063, filed on Sep. 27, 2001, and entitled GENERATING, UPDATING, AND MANAGING MULTI-TAXONOMY ENVIRONMENTS.

TECHNICAL FIELD OF THE INVENTION

This invention relates to electronic commerce and more particularly to generating, updating, and managing multi-taxonomy environments.

BACKGROUND OF THE INVENTION

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of e-commerce transactions (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with previous e-commerce techniques have been substantially reduced or eliminated.

In one embodiment of the present invention, an electronic commerce system includes one or more databases that store product data for one or more products. The system also includes a master global content directory that includes a plurality of product classes organized in a hierarchy. Each product class categorizes a number of products and is associated with one or more attributes of the products categorized in the product class. At least one of the product classes has one or more associated product pointers that identify one or more of the databases. The system further includes one or more secondary content directories that include one or more product classes mapping back to one or more product classes in the master global content directory. Each product class in the secondary content directory is associated with a product class in the master global content directory and has one or more associated class pointers that identify the one or more product classes in the master global content directory to which the product class is mapped. The system also includes a search interface that communicates a search query to one or more of the database to search product data stored in the databases identified by one or more of the product pointers.

Particular embodiments of the present invention may provide one or more technical advantages. For example, certain embodiments of the present invention provide one or more secondary content directories that are linked to a master global content directory and that allow users of the e-commerce system to create content directories organized and arranged to meet the particular requirements and needs of one or more of the users. For example, the organization of the product classes in the master global content directory may not be the optimal organization for particular buyers or sellers using the e-commerce system. Therefore, a user of the e-commerce system may create a secondary content directory having product classes that are organized to meet the specific needs of the user and which are mapped back to the product classes in the master global content directory. Therefore, the user may have a customized view into the master global content directory.

Furthermore, particular embodiments of the present invention also allow the secondary content directories to be created and used without having to duplicate the product data stored in the seller databases. Because the secondary content directories are mapped back to the master global content directory, pointers to particular product data from each class do not need to be duplicated and updated for the secondary content directories. When a user selects a product class and enters search parameters, the user's search is transparently performed with respect to the seller databases identified by the product classes in the master global content directory to which the selected class in the secondary content directory is mapped. Therefore, users of the e-commerce system may more easily and inexpensively create and use secondary content directories. Other technical advantages may be readily apparent to those skilled in the art from the following figures, description, and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
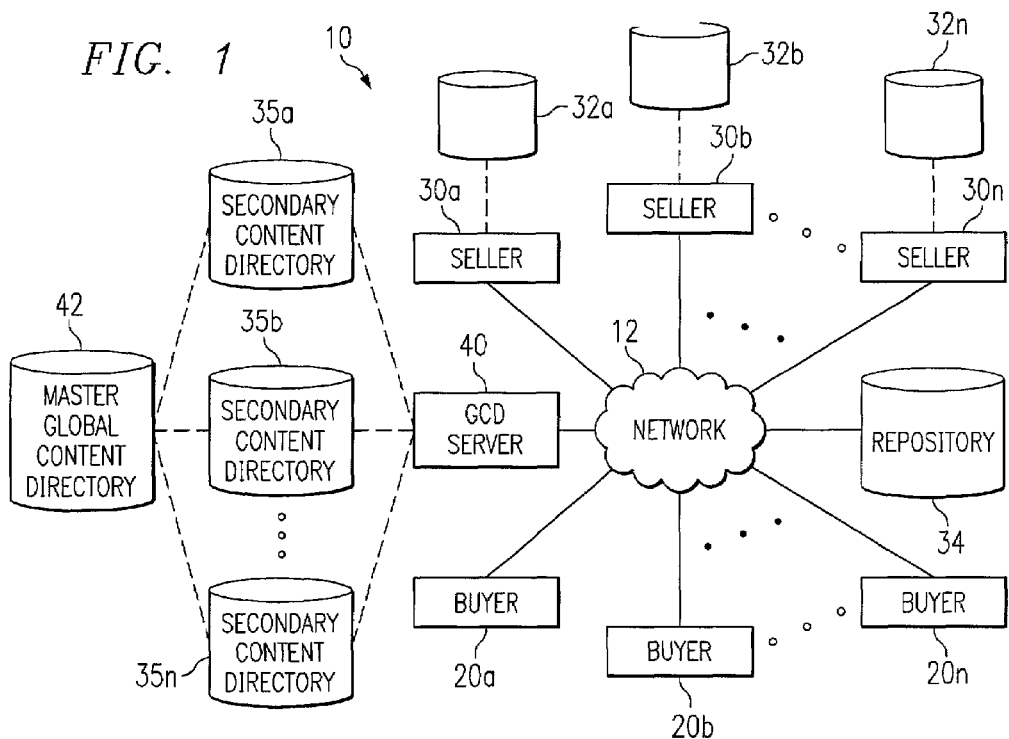
FIG. 1 illustrates an example electronic commerce system.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a master GCD 42 supported by GCD server 40. Master GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that master GCD 42 provide directory services to buyers 20 and sellers 30 around the world (or in any other particular region) or that the content of master GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of master GCD 42, a buyer 20 may have to access numerous seller web sites to determine which seller 30 offers certain desired features of the product at the best price. Sellers 30 may each provide one or more databases 32, such as relational databases, that include data identifying the products available from sellers 30 and their features. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is master GCD 42. Master GCD 42 is a universal directory of the contents of multiple seller databases 32 (and potentially all seller databases 32). Master GCD 42 may be implemented using one or more servers 40 or other computers located at one or more locations. Most or all of the content in these seller databases 32 remains stored in databases 32, but this content is accessible using master GCD 42. Therefore, like the global database described above, master GCD 42 provides buyers 20 with access to product data relating to a multitude of products (and potentially seller data relating to one or more sellers 30 of the products), but unlike the global database, master GCD 42 does not attempt to store all of this data in one enormous database. Where appropriate, reference to "data" is meant to include product data (meaning information reflecting values for certain attributes of a product), seller data (meaning information reflecting values for certain seller attributes), or both product data and seller data.

Master GCD 42 provides a directory of products using a directory structure in which products are organized using a hierarchical classification system. A buyer 20 may navigate or search the directory to find a particular product class into which products are categorized. The product data (and potentially seller data) associated with a product included in a product class may actually be stored in and obtained by master GCD 42 from a seller database 32. However, the requested data may be transparently provided to buyer 20 such that all of the product data may appear to buyer 20 as being included in master GCD 42. Although product and/or seller data has primarily been described as being stored in seller databases 32, the present invention contemplates product data being stored in any suitable manner and being retrieved from any suitable sources. For example, system 10 may include a shared data repository 34 that contains product data and/or seller data that may be combined with data from one or more seller databases 32. Shared data repository 34 may include commonly used data that may be used by multiple sellers 30 (for example, common data such as manufacturer product descriptions may be combined with more specific seller data, such as product pricing data).

But even with master GCD 42 simplifying the process of locating appropriate products and sellers 30, there are still a large product classes that a buyer 20 must sort through to search a desired product. Buyer 20 may only be interested in blue ink ball-point pens from sellers 30 that sell in the United States. Even though buyer 20 can navigate the directory structure of master GCD 42 to a ball-point pen class and perform a search for ball-point pens entering product and seller search criteria, buyer 20 nevertheless has to expend the time in navigating the directory structure of master GCD 42 and buyer 20 must know where the ball-point pen class is located within the directory structure. In addition, the organization and arrangement of the directory structure for master GCD 42 is arranged so as to provide the greatest amount of convenience and efficiency to the largest number of buyers 20 and. But for many buyers 20 and sellers 30, the organization of master GCD 42 may not meet their business, personal, or organizational requirements. Having to operate within the set directory structure of master GCD 42 when that directory structure is not the same as the organizational structure required or preferred by buyers 20 adds a level of frustration and difficulty for buyers 20 trying to conduct an e-commerce transaction using system 10.

A solution to the above problems, at least in part, are secondary content directories 35. As shown in FIG. 1, there can be as many or as few secondary content directories 35 as desired by buyers 20 and sellers 30. Secondary content directories 35 decrease the amount of searching time for buyers 20 and therefore increase the efficiency of system 10. As with master GCD 42, secondary content directories 35 may be implemented using servers 40 or other computers located at one or more locations. Product classes in secondary content directories 35 are associated with classes in master GCD 42 instead of being associated with the product data and allow buyers 20 to reorganize and arrange the hierarchical classification system of master GCD 42.

Secondary content directories 35 provide a directory of product classes using a directory structure that may be different from the directory structure of master GCD 42 and may include less than all of the product classes included in master GCD 42. The products remain organized in a hierarchical classification system but each buyer 20 may determine the hierarchical classification and which product classes are included based on the needs and requirements of each buyer 20. Secondary content directories 35 include product classes that are associated with the product classes in master GCD 42 whereas the product classes in master GCD 42 are associated with actual product data in seller databases 32 (for example, using pointers identifying particular data or databases). The user of a secondary content directory 35, whether it be a buyer 20 or seller 30, determines the hierarchical structure of secondary content directory 35, which product classes are included in secondary content directory 35, and which product classes in master GCD 42 the product classes map back to. A buyer 20 may still navigate or search the directory structure of a secondary content directory 35 to locate a particular product class. The product data (and potentially seller data) associated with a product class may actually be accessed by secondary content directory 35 using the pointers associated with master GCD 42. Once buyer 20 locates the desired product class and enters search criteria, the requested product data may be transparently provided to buyer 20 such that all of the product data may appear to buyer 20 as being included in the secondary content directory 35 so that buyer 20 may not even be aware of the existence and operation of master GCD 42 and seller databases 32.

Figure 2:
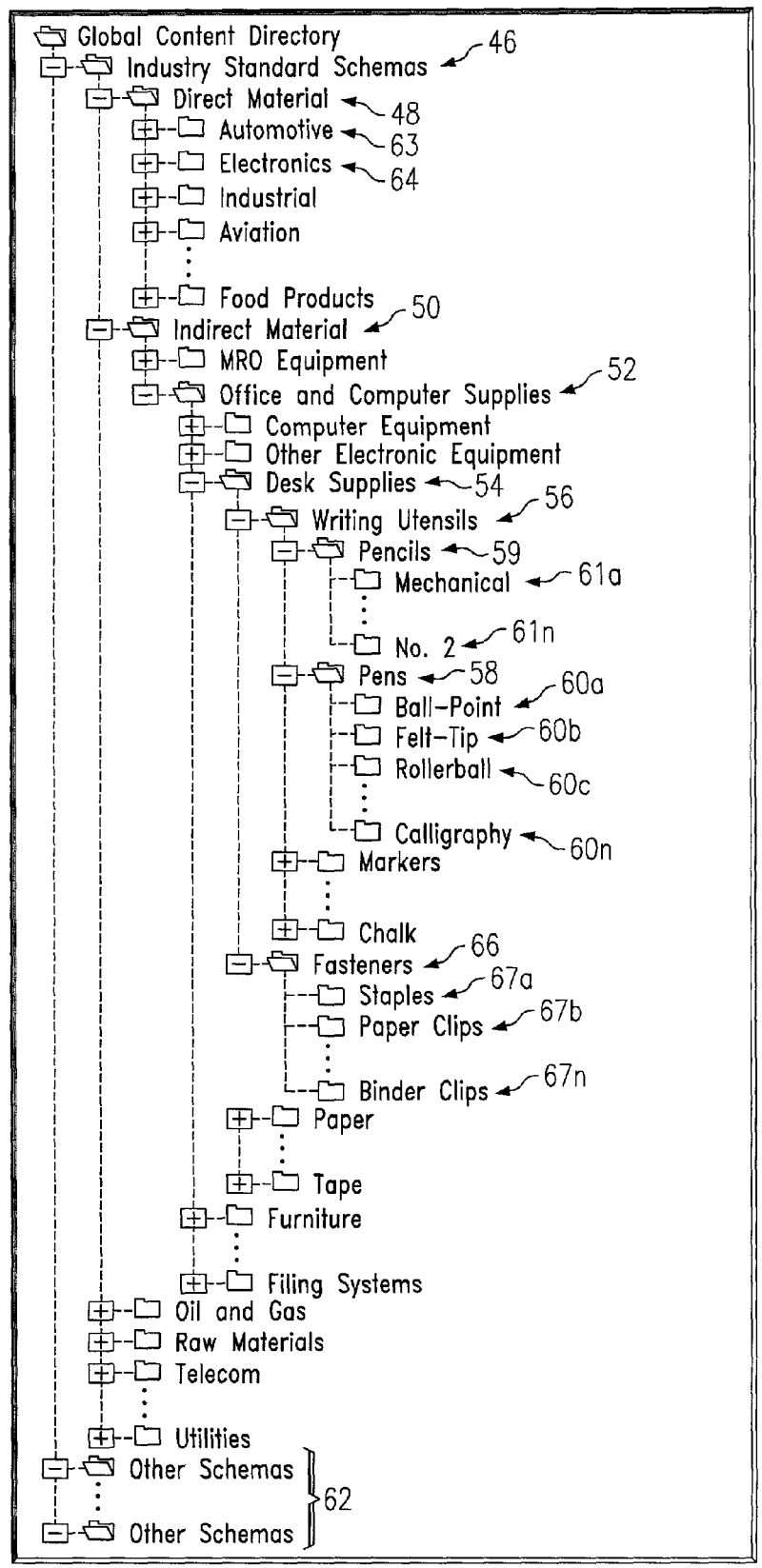
FIG. 2 illustrates an example directory structure of an example master global content directory.

FIG. 2 illustrates an example directory structure 44 of an example master GCD 42. Products categorized in master GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any appropriate data reflecting an instance of a product attribute or a seller attribute. Product attribute values and seller attribute values may include numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60*a*-60*n* ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more sub-classes, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60*b* form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44, may be stored as a part of or separate from master GCD 42, or may be stored as secondary content directories 35.

A buyer 20 may navigate through directory structure 44 by expanding or collapsing various classes as desired. For example, FIG. 2 illustrates an expansion of certain classes of directory structure 44 to reach a felt-tip pen class 60b. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pens having medium tips. Alternatively, if buyer 20 navigates to the end of a branch of directory structure 44, such as felt-tip pen class 60b, master GCD 42 may then enable buyer 20 to search for such pens that have blue ink and medium tips (which may reach the same result as the search above).

Buyer 20 may also search for sellers matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers matching certain seller attribute values in any appropriate manner. In one embodiment, for example, buyer 20 provides search criteria including both values for product attributes and for seller attributes (search criteria may instead be generated automatically, in whole or in part, as described below), and server 40 searches for products that match the product attribute criteria and are offered by sellers matching the seller attribute criteria. In another embodiment, buyer 20 provides only product attribute values as search criteria, and server 40 limits its search for products matching the product attribute criteria to databases 32 associated with sellers 30 known to match seller attribute criteria that buyer 20 may want according to a buyer profile or otherwise.

As described above, in one embodiment product data (at least product data more detailed than data provided by a taxonomy) and seller data are not stored in master GCD 42, but are stored in databases 32. For example, a seller 30 may maintain a relational database 32 that includes a plurality of tables containing product attribute values for a variety of products and seller attribute values for each product, a set of products, or all of the products offered by seller 30. Product data and seller data may be integrated into one or more tables or may be segregated into different tables. Moreover, product data and seller data for a seller 30 may be stored in the same or separate databases. One or more product pointers may be associated with each class to identify the location of one or more databases 32 that include product data and/or seller data for products contained in that class or to identify particular data in databases 32. Therefore, master GCD 42 may execute a search for products in databases 32 identified by a product pointer corresponding to a user-selected (or automatically selected) class. Master GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

Master GCD 42 may be implemented using the lightweight directory access protocol (LDAP), which enables directories to be provided using the tree-like structure described above. However, any other appropriate technique or protocol for creating master GCD 42 may alternatively be used and master GCD 42 may have any appropriate structure. Furthermore, master GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60b, a search performed by buyer 20 (or by master GCD 42 on behalf of buyer 20) from felt-tip pens class 60b may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by master GCD 42 to only include felt-tip pens within that database 32. Buyer 20 may also identify additional product attribute values and/or seller attribute values as additional search criteria.

When master GCD 42 has performed a search of the databases 32 identified by a product pointer or product pointers associated with a class that buyer 20 has selected (or that has been automatically selected), master GCD 42 may return product data and/or seller data associated with one or more products matching the search criteria. Master GCD 42 may integrate the product data and/or seller data resulting from the search into directory structure 44 so that the data appears to buyer 20 as being part of master GCD 42. Master GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller matching certain seller attribute values using master GCD 42 and thus eliminate or reduce the need for buyer 20 to individually search numerous seller databases 32 to find the desired product available from a suitable seller. Master GCD 42 provides access to product and/or seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and/or seller data relating to a product, and then communicate with an appropriate database 32 through GCD server 40 or otherwise. Such access to vast numbers of products is provided without the requirement that all data about the products and/or sellers be stored in a global database. Instead, this data may be stored in seller databases 32 that can be readily accessed using master GCD 42.

Figure 3:
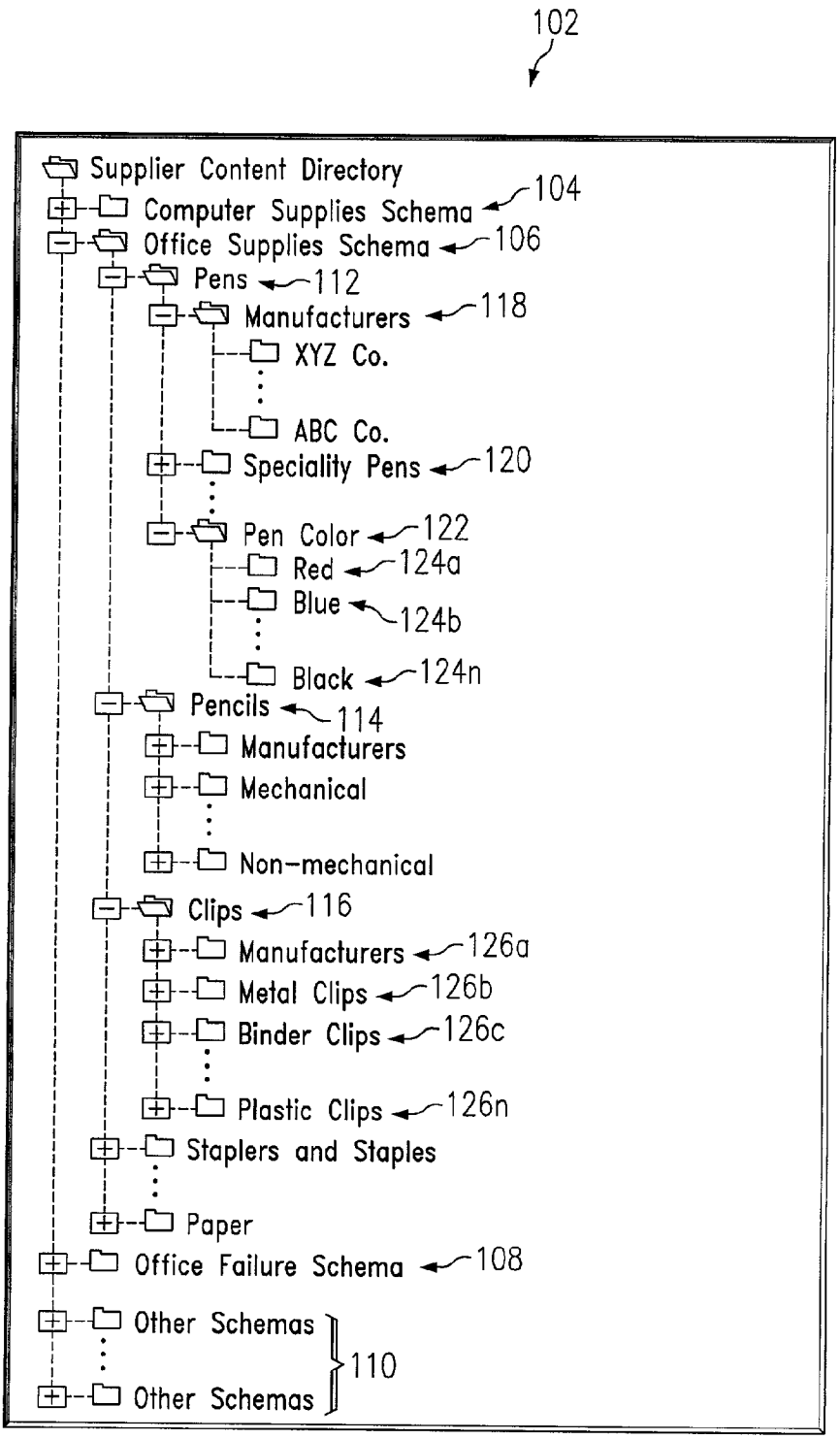
FIG. 3 illustrates an example directory structure of an example secondary content directory.

FIG. 3 illustrates an example directory structure 102 of an example secondary content directory 35. As discussed above, there are times when directory structure 44 of master GCD 42 may be cumbersome for a particular buyer 20 to navigate and search. For example, a buyer 20 may desire a directory structure that is organized around their needs and requirements. The portion of directory structure 102 shown in FIG. 3 may be for supplier of office products where the supplier buys the office products from various office supply manufacturers and resells the office products to businesses and individuals. The operation of directory structure 102 is the same as directory structure 44 except that directory structure 102 does not include pointers to product data stored in seller databases 32 and/or data repository 34. Instead, the product classes in directory structure 102 is associated with the one or more product classes of directory structure 44 of master GCD 42, as described below.

Directory structure 102 includes different schemas and product classes organized in a manner that satisfy the needs of the supplier. Although the supplier may purchase its office products from the office product manufacturers using master GCD 42, the supplier may prefer a different arrangement of product classes to sell the office products to its customers. Therefore, the supplier may desire to create directory structure 102 so that it is easy for the customers of the supplier to search for and locate office products. To create directory structure 102, the supplier determines what classes from master GCD 42 are needed in directory structure 102 so that the supplier may adequately serve its customers. For example, since the supplier is only providing office products, there may be no need for the supplier to include automotive class 63 and electronics class 64 and any associated sub-classes in directory structure 102. But the supplier may want to include desk supplies class 54 and any associated sub-classes in directory structure 102.

In addition to determining what product classes to use in directory structure 102, the supplier also determines the best way to organize the product classes. Because the supplier specializes in office products and master GCD 42 is organized to efficiently handle and process all product types, in creating directory structure 102 the supplier may desire to rearrange or reorganize the product classes from master GCD 42. For instance, directory structure 102 includes a computer supplies schema 104, an office supplies schema 106, an office furniture schema 108, and any other appropriate schemas 110. These schemas make it very easy for the supplier's customers to locate the desired office products. Within office supplies schema 106, the supplier may wish to have a pens class 112, a pencils class 114, and a clips class 116. Within pens class 112, there is a manufacturers class 118, a specialty pens class 120, and a pen color class 122. Therefore, the layout and relationships between the classes, parent classes, and sub-classes in directory structure 102 is similar to that of directory structure 44. A user of system 10 may use any appropriate graphical or other tool to create directory structures of secondary content directories 35. For example, a graphical tool may be provided that allows a user to "drag and drop" icons representing classes in directory structure 44 to appropriate positions in directory structure 102.

Instead of the classes in directory structure 102 having associated pointers that identify product data in seller databases 32 and/or data repository 34 as with the product classes in directory structure 44, the product classes in directory structure 102 have one or more associated class pointers that identify product classes in directory structure 44 of master GCD 42. For example, pens class 112 is a product class having a pointer that identifies pens class 58 in directory structure 44, meaning pens class 112 maps back to pens class 58. When a product class in GCD 35 (such as pens class 112) maps back to a product class in master GCD 42 (such as pens class 58), the sub-classes below the product class being mapped to (here pens class 58) are also mapped to from the class in GCD 35 (here pens class 112). A buyer 20 may navigate and search directory structure 102 just like a buyer 20 searches and navigates directory structure 44, as described above. For instance, a buyer 20 may search directory structure 102 looking for pens having blue ink. Buyer 20 may navigate to blue pen color class 124b and initiate a search for all pen types having blue ink. When buyer 20 enters the search criteria at blue pen color class 124b, the associated class pointers for blue pen color class 124b indicate that the search is to be performed of the locations identified by pointers in pens class 58. This occurs transparently and seamlessly to buyer 20.

Another example of how the supplier may wish to reorganize the classes from directory structure 44 into directory structure 102 is with clips class 116. Fasteners class 66 in master GCD 42 includes all types of fasteners including staples, paper clips, and binder clips. But the supplier may desire to further differentiate between the different kinds of clips. Therefore, clips class 116 in directory structure 102 includes, but is not limited to, manufacturers class 126a, metal clips class 126b, binder clips 126c, and plastic clips 126n. The supplier therefore associates clips class 116 with fasteners class 66 and maps back to fasteners class 66. More specifically, binder clips class 126c would map back to binder clips class 67n and metal clips class 126b and plastic clips class 126n would map back to paper clips class 67b. For instance, if buyer 20 was searching for jumbo-sized metal paper clips in directory structure 102, buyer 20 would navigate to metal clips class 126b and enter search criteria. Since metal clips class is mapped back to paper clips class 67b, buyer 20 would perform a search of the product data from paper clips class 67b using the search criteria entered at metal clips class 126b.

The associated class pointers and mapping back allows directory structure 102 to have a different product class layout without requiring the duplication of pointers associated with a class (and thus the requirement that multiple sets of pointers be maintained and updated). Since the product classes in directory structure 102 have associated class pointers that identify product classes in master GCD 42 instead of actual product data or data locations, master GCD 42 is still the only directory that identifies product data. Because the data pointers do not have to be duplicated, the process of creating and maintaining a directory structure for a secondary content directory 35 is improved.

Figure 4:
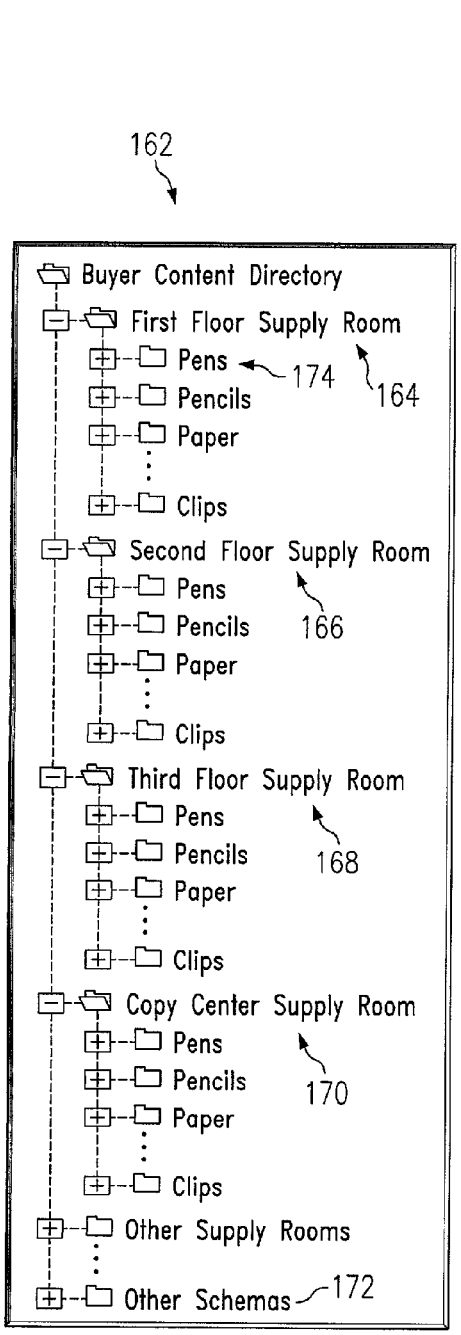
FIG. 4 illustrates an example directory structure of another example secondary content directory.

FIG. 4 illustrates an example directory structure 162 of another example secondary content directory 35. Directory structure 162 may be for a buyer 20 who is seeking to buy office products for use in a business. For instance, directory structure 162 may be for a buyer 20 who is an office services manager and responsible for making sure the company that buyer 20 works for has enough office supplies. As with directory structure 102, buyer 20 may want to arrange the product classes are of directory structure 162 different from those of directory structures 44 and 102.

Directory structure 162 includes a first floor supply room class 164, a second floor supply room class 166, a third floor supply room class 168, and a copy center supply room class 170. Having a class for each supply room facilitates buyer's 20 tracking of office supplies. Buyer 20 may track the office supplies needed and the office supplies currently in inventory by each supply room and each supply room may have its own office supply requirements. For instance, engineers may be located on the first floor and therefore the first floor supply room would stock office supplies geared towards an engineering practice while the third floor my house accounting and therefore the third floor supply room may stock office supplies geared towards accounting. The difference in what each supply room stocks is noted in the sub-classes under each supply room class 164, 166, 168, and 170, and those sub-classes are product classes that are mapped back to directory structure 102 which is mapped back to directory structure 44 (or they may be mapped directly to directory structure 44).

For example, if buyer 20 needs to replenish the supply of pens in the first floor supply room, buyer 20 may navigate to first floor supply room class 164 and then to first floor pens class 174. Under first floor pens class 174 may be further sub-classes for the different types of pens stocked in the first floor supply room. First floor pens class 174 is mapped back to pens class 112 of directory structure 102, which is mapped back to pens class 58 of directory structure 44. First floor pens class 174 has associated class pointers that identify pens class 112 and pens class 112 has associated class pointers to pens class 58. Buyer 20 enter search criteria, such as pen type or ink color via first floor pens class 174. The associated class pointers for first floor pens class 174 identify pens class 112, which has associated class pointers that identify pens class 58 of master GCD 42. By buyer 20 entering search criteria at first floor pens class 174, a search is performed of the product data in seller databases 32 and/or data repository 34 identified by pointers in pens class 58 and the search results are returned to buyer 20. Each of the pens classes in directory structure 162 may be mapped back to pens class 112 and each supply room may include different pen search criteria depending on the types of pens stocked in each of the supply rooms.

In summary, secondary content directories 35 and their associated directory structures allow a buyer 20 to arrange and organize a directory that best fits the need of buyer 20. Many businesses do not track their products needs as directory structure 44 is structured, which is generally by product characteristics. Instead, buyers 20 often track the products they buy according to where the products are located within the business, how the products are used within the business, how the products relate to other products, or any other appropriate arrangements. Directory structure 102 allows office products supplier to have a convenient arrangement of the products for their customers and directory structure 162 allows an office service manager to keep a close and organized watch on the office supplies and supply rooms for a business. Being able to create customized secondary content directories 35 and directory structures adds value to system 10 and master GCD 42 because it increases ease of use and overall functionality.

Figure 5:
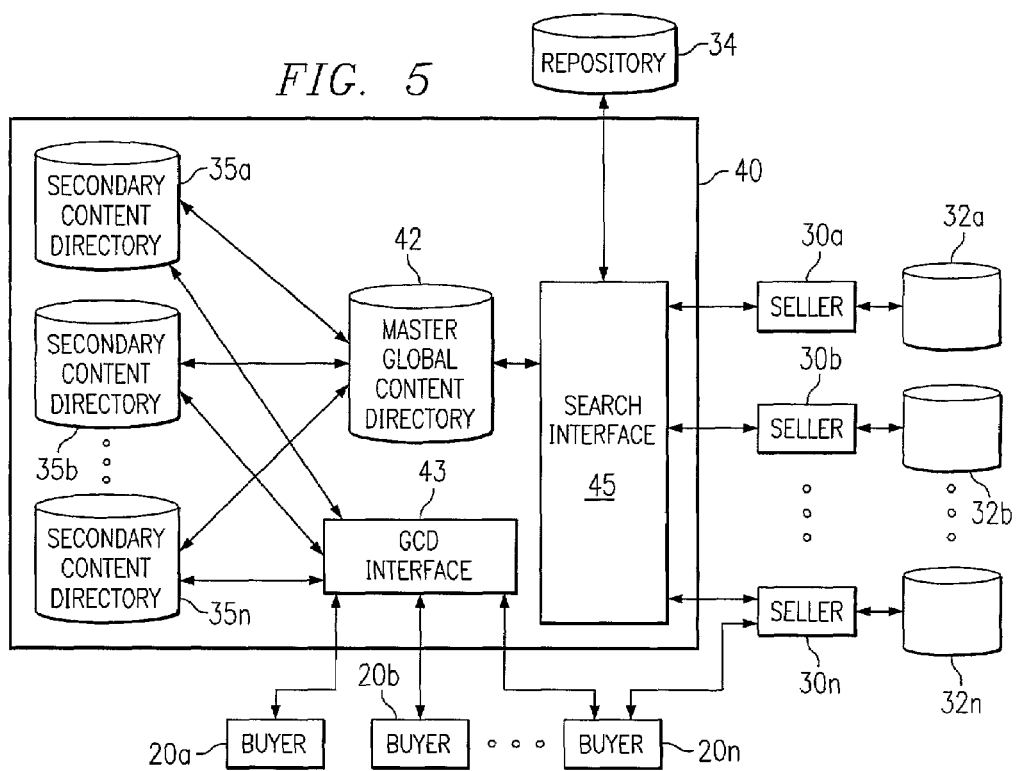
FIG. 5 illustrates an example electronic commerce system in further detail.

FIG. 5 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to secondary content directories 35 and master GCD 42 using a web server or in any other appropriate manner. Although secondary content directories 35 and master GCD 42 are shown as being internal to GCD server 40, secondary content directories 35 and master GCD 42 may be internal or external to GCD server 40, as described above. GCD server 40 may also include hardware and/or software for implementing one or more GCD interfaces 43 to allow buyers 20 to access one or more secondary content directories 35. A buyer 20 may access server 40 and use a GCD interface 43 to search or navigate secondary content directories 35 and/or seller databases 32. Information may be communicated between buyers 20, sellers 30, secondary content directories 35, and master GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by master GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of master GCD 42 using a secondary content directory 35. GCD interface 43 may allow buyer 20 to both navigate or "browse" the classes of a secondary content directory 35 and to search for a particular class or classes. For example, buyer 20 may either navigate a secondary content directory 35 to find a class into which pens are categorized or buyer 20 may search a secondary content directory 35 for class names including the word "pen." Any other suitable methods for identifying a particular class may also be used. When buyer 20 has located the appropriate class for the product buyer 20 desires, buyer 20 may then request a listing of products in that class matching certain product attribute values. For example, if buyer 20 is browsing first floor pens class 174, buyer 20 may request all products in class 174 that satisfy the criteria for pens stocked in the first floor supply room and buyer 20 would search the product data associated with the mapped back to pen class 58.

A search interface 45, or any other appropriate component of GCD server 40, may facilitate such a request by searching or requesting searches of repository 34 and/or seller databases 32 identified by one or more product pointers associated with pens class 58, as described above. Search interface 45 may provide buyer 20 a search form in which to enter one or more search criteria. The types of search criteria that may be used may be identified in the search form or buyer 20 may be allowed to perform a general search of databases 32 and/or repository 34 for the product classes mapped back to the secondary content directory 35 that buyer 20 has access to. For example, search interface 45 may provide buyer 20 with a search form tailored for first floor pen class 174 that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want (and/or data in repository 34 associated with such sellers 30).

Based on search criteria provided by buyer 20 or automatically generated, search interface 45 may communicate a query to the appropriate seller database(s) 32 and/or repository 34 requesting that databases 32 and/or repository 34 each return a listing of all products (including associated product data and/or seller data) that meet the search criteria. Databases 32 and/or repository 34 may also return data relating to attribute values that were not included in the search criteria. For example, databases 32 may return a price and availability of products that meet the search criteria even if price and availability were not search criteria. The responses to the queries of databases 32 and/or repository 34 may be displayed to buyer 20 in any appropriate manner. For example, the products may be listed in order of relevance to the search criteria according to any suitable matching criteria. Furthermore, search interface 45 or GCD interface 43 may reorder the product listing based on a request from buyer 20. For example, buyer 20 may request that the matching products be listed in order from least expensive to most expensive. Alternatively, the search results may be communicated directly to buyer 20 from databases 32 and/or repository 34.

Buyer 20 may select a product from the product listing to indicate a desire to initiate a transaction regarding the product, such as a purchase of the product. On such a selection, a GCD 35 or 42 or other component of system 10 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case the RID may be used to look up the associated network address and then communicate the network address to buyer 20). Buyer may access the seller 30 using the RID (or network address) and request a transaction regarding the product using the GUID. GCD 35 or 42 or other component of system 10 may even provide a link including a URL of a web site associated with the seller 30 or may provide another appropriate method for buyer 20 to be connected to seller 20. Although only a single example arrow (between buyer 20n and seller 30n) is shown to illustrate communication between buyers 20 and sellers 30, it should be understood that any buyer 20 may communicate with any seller 30 to conduct appropriate transactions.

One advantage associated with secondary content directories 35 is that permission levels for certain product classes of master GCD 42 may be built into the mapping and allow master GCD 42 to identify specialized product data for different buyers 20 and sellers 30. For example, directory structure 102 only provides access to the product classes of directory structure 44 that the product classes of directory structure 102 are mapped back to. Likewise, directory structure 162 may only provides access to the product classes of directory structure 102 that the product classes of directory structure 162 map back to (and thus only the product classes of directory structure 44 that the classes of directory structure 102 map back to if directory structure refers to directory structure 102). So in effect, directory 162 experiences two levels of filtering. The first level of filtering is from directory structure 44 to directory 102 and the second level of filtering is from directory 102 to directory structure 162. The filtering aspect allows master GCD 42 to have specialized product data for certain buyers 20 and sellers 30 which that may only accessible if a secondary content directory 35 maps back to the specialized product data (there may be no direct access of directory structure 44 permitted).

For example, seller 30a may have a one deal with a buyer 20a and a separate deal with buyer 20b. To account for the different arrangements, seller 30a may create secondary content directory 35a for access by buyer 20a and secondary content directory 35b for access by buyer 20b. In creating secondary content directory 35a, seller 30a will determine which product classes of master GCD 42 buyer 20a will have access to. In creating secondary content directory 35b, seller 30a will be able to determine which product classes of master GCD 42 buyer 20b will have access to. Therefore, seller 30a may store the product information for both special deals in an associated seller database 32 but because buyers 20a and 20b will only have access to the product data that secondary content directories 35a and 35b allow, buyers 20a will not be able to view the special deals for buyer 20b and vice versa.

Figure 6:
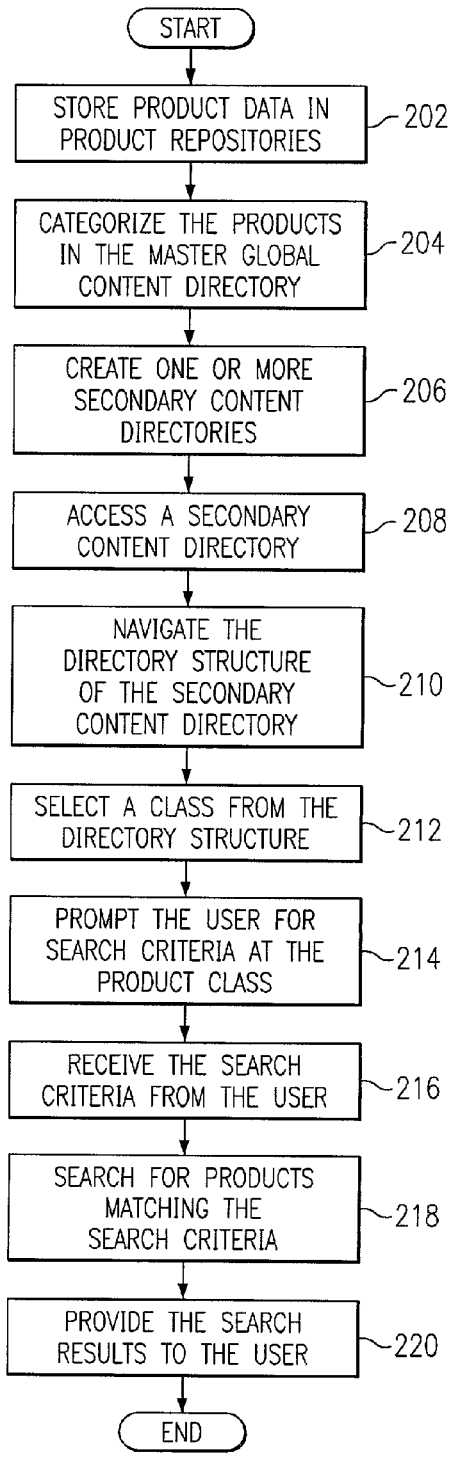
FIG. 6 illustrates an example method for generating, updating, and managing multi-taxonomy environments in an electronic commerce transaction.

FIG. 6 illustrates an example method for generating, updating, and managing multi-taxonomy environments in an electronic commerce transaction using master GCD 42 and one or more secondary content directories 35. The method begins at step 202 when GCD server 40 stores the product data in one or more product data repositories, such as seller databases 32 and/or shared data repository 34. At step 204, GCD server 40 associates and categorizes the products and product data into a plurality of product classes. Associating the product classes with product data includes associating one or more product pointers with the product classes that identify the product data stored in seller databases 32 and/or data repository 34. Categorizing the products into product classes allows buyer 20 to search for and locate products associated with particular product and/or seller attributes.

After the products and product data has been stored and categorized, the method continues at step 206 where GCD server 40, buyers 20, sellers 30, and/or any other appropriate user or system administrator creates one or more secondary content directories 35 from master GCD 42. As described above, secondary content directories 35 allow a buyer 20 or seller 30 to rearrange and organize all or less than all of the product classes in master GCD 42 to create a new directory structure that satisfies the business requirements of buyer 20 and/or seller 30 and has a structure that more closely aligns with the structure of buyer 20 and/or seller 30. Secondary content directories 35 include one or more product classes that map back to particular product classes in master GCD 42. When a product class maps back to a product class in master GCD 42, not only may the product class in master GCD 42 be mapped to, but all the sub-classes of the product class in master GCD 42 may also be mapped to. This allows buyers 20 or sellers 30 to take product classes of master GCD 42 and in effect plug the product classes into a new directory structure.

The product classes in a secondary GCD 35 include associated class pointers that identify the product class to which they map. The party creating a secondary content directory 35 determines what the schemas and classes will be, the organization within the directory structure, and has the option of what product classes in master GCD 42 to map to. In addition to mapping back to master GCD 42, secondary content directories 35 may also map back to other secondary content directories 35 that map back to master GCD 42. For example, secondary content directory 35a may be organized for seller 30b and directly map to master GCD 42. Seller 30b may then desire to create a secondary content directory for use by its buyers 20 and therefore create secondary content directory 35b that maps to secondary content directory 35a.

The method continues at step 208 when a buyer 20 accesses secondary content directory 35 using GCD interface 43. For example, buyer 20 may access directory structure 162 of secondary content directory 35b. As described above, buyers 20 may access secondary content directories 35 using a web browser or in any other appropriate manner. Buyer 20 navigates directory structure 162 at step 210 to a product class that is specific enough for buyer 20 (and/or a class that is at the end of a branch), as described above. At step 212, buyer 20 selects the product class. Buyer 20 may also request a search of a product class appearing in a "frequently searched product classes" list that may be maintained for the convenience of buyer 20 without having to navigate through a list of classes. Such a list may be stored in a buyer profile, described above, or elsewhere by GCD server 40 or another computer accessible to buyer 20. As an alternative to steps 210 and 212, a class may be automatically selected based on a buyer profile. When a product class has been selected, buyer 20 is prompted at step 214 to enter search criteria. For example, as described above, server 40 may provide buyer 20 a search form in which to enter one or more search criteria or a single field where buyer 20 may enter desired criteria, and the fields of the search form may correspond to some or all of the product attributes within the product ontology and/or seller attributes within the seller ontology corresponding to the product class that has been selected. Such criteria may include product attribute values, seller attribute values, or a combination of product attribute values and seller attribute values.

At step 216, buyer 20 provides the desired search criteria to search selected product class. At step 218, search interface 45 uses the search criteria provided by buyer 20 to search the seller databases 32 and/or shared data repository 34 identified by pointers in the product class or classes of GCD 42 identified by class pointers in the product class selected by buyer 20. Search interface 45 may perform the search in any appropriate manner. At step 220, GCD server 40 presents one or more products matching (or partially matching) the search criteria to buyer 20 (possibly integrated with the display of a secondary content directory structure), and the method ends. Alternatively, the results of the search query may be communicated directly from repository 34 and/or seller database(s) 32 to buyer 20.

Although the present invention has been described with several embodiments, divers changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. An electronic commerce system for generating, updating, and managing multi-taxonomy environments, the system comprising:
   one or more sellers' databases operable to store product data for one or more products;
   a master global content directory coupled with the one or more sellers' databases including a plurality of product classes organized in a hierarchy according to a first classification system, each product class categorizing a plurality of products and associated with one or more attributes of the products categorized in the product class, at least one of the product classes having one or more associated product pointers that identify one or more of the sellers' databases;
   one or more secondary content directories coupled with the master global content directory including one or more product classes organized in a hierarchy according to a second classification system that is distinct from the first classification system of the master global content directory, each product class being mapped to one or more product classes in the master global content directory and having one or more associated class pointers that identify the one or more product classes in the master global content directory to which the product class is mapped; and
   a search interface operable to:
   receive a selection of a product class of a secondary content directory from a user, the selected product class having at least one class pointer identifying at least one product class in the master global content directory; and
   communicate, in response to selection of the product class by the user, a search query to one or more of the sellers' databases to search product data stored in the sellers' databases identified by one or more of the product pointers to facilitate a commercial transaction involving one or more products.

2. The system of claim 1 wherein the secondary content directories are personal to one or more users and are organized in a hierarchy satisfying one or more requirements for the users.

3. The system of claim 1 wherein a class pointer identifying a product class in the master global content directory also inherently identifies all product classes under the product classes in the hierarchy of the master global content directory.

4. The system of claim 1 wherein the search interface is further operable to:
   receive the selection of a product class of a secondary content directory from a user of the secondary content directory;
   receive one or more search parameters for a product from the user;
   determine the product classes in the master global content directory identified by the class pointers in the selected product class;
   determine the sellers' databases identified by product pointers in the determined product classes of the master global content directory; and
   communicate a search query having the search parameters to the determined databases.

5. The system of claim 1 wherein access to the master global content directory is determined by which product classes in the master global content directory are identified by class pointers associated with the product classes in a secondary content directory.

6. The system of claim 1, wherein one or more of the product pointers identify particular product data in one or more of the databases.

7. The system of claim 1, wherein the search query comprises desired values, specified by the user of one of the secondary content directories, for one or more of the product attributes associated with a selected product class.

8. A method for generating, updating, and managing multi-taxonomy environments in an electronic commerce transaction, the method comprising:
   storing product data for one or more products in one or more sellers' databases;
   categorizing the products in a master global content directory, the master global content directory coupled with the one or more sellers' databases and comprising a directory structure including a plurality of product classes organized in a hierarchy according to a first classification system, each product class categorizing a plurality of products and associated with one or more attributes of the products categorized in the product class, one or more of the product classes having one or more associated product pointers that identify one or more of the sellers' databases;

providing a plurality of users access to the master global content directory through one or more secondary content directories, the secondary content directories coupled with the master global content directory and comprising one or more product classes organized in a hierarchy according to a second classification system that is distinct from the first classification system of the master global content directory, each product class being mapped to one or more product classes in the master global content directory and having one or more associated class pointers that identify the one or more product classes in the master global content directory to which the product class is mapped;

receiving a selection of a product class of a secondary content directory from a user, the selected product class having at least one class pointer identifying at least one product class in the master global content directory; and in response to the selection of the product class by the user, communicating a search query to one or more sellers' databases to search product data stored in the sellers' databases identified by one or more of the pointers to facilitate a commercial transaction involving one or more products.

9. The method of claim 8 further comprising:

receiving the selection of a product class of a secondary content directory from a user of the secondary content directory;

receiving one or more search parameters for a product from the user;

determining the product classes in the master global content directory identified by the class pointers in the selected product class;

determining the sellers' databases identified by product pointers in the determined product classes of the master global content directory; and communicating a search query having the search parameters to the determined databases.

10. The method of claim 8 wherein the secondary content directories are personal to one or more users and are organized in a hierarchy satisfying one or more requirements for the users.

11. The method of claim 8 wherein a class pointer identifying a product class in the master global content directory also inherently identifies all product classes under the product classes in the hierarchy of the master global content directory.

12. The method of claim 8 wherein providing a plurality of users access to the master global content directory through one or more secondary content directories comprises determining access to the master global content directory by which product classes in the master global content directory are identified by class pointers associated with the product classes in a secondary content directory.

13. The method of claim 8, wherein one or more of the product pointers identifies particular product data in one or more of the databases.

14. The method of claim 8, wherein the search query comprises desired values, specified by the user of one of the secondary content directories, for one or more of the product attributes associated with a selected product class.

15. Software for generating, updating, and managing multi-taxonomy environments in an electronic commerce transaction, the software embodied in a computer-readable medium and operable to:

store product data for one or more products in one or more sellers' databases;

categorize the products in a master global content directory, the master global content directory coupled with the one or more sellers' databases and comprising a directory structure including a plurality of product classes organized in a hierarchy according to a first classification system, each product class categorizing a plurality of products and associated with one or more attributes of the products categorized in the product class, one or more of the product classes having one or more associated product pointers that identify one or more of the sellers' databases;

provide a plurality of users access to the master global content directory through one or more secondary content directories, the secondary content directories coupled with the master global content directory and comprising one or more product classes organized in a hierarchy according to a second classification system that is distinct from the first classification system of the master global content directory, each product class being mapped to one or more product classes in the master global content directory and having one or more associated class pointers that identify the one or more product classes in the master global content directory to which the product class is mapped;

receive a selection of a product class of a secondary content directory from a user, the selected product class having at least one class pointer identifying at least one product class in the master global content directory; and in response to the selection of the product class by the user, communicate a search query to one or more sellers' databases to search product data stored in the sellers' databases identified by one or more of the product pointers to facilitate a commercial transaction involving one or more products.

16. The software of claim 15 further comprising:

receiving the selection of a product class of a secondary content directory from a user of the secondary content directory;

receiving one or more search parameters for a product from the user;

determining the product classes in the master global content directory identified by the class pointers in the selected product class;

determining the sellers' databases identified by product pointers in the determined product classes of the master global content directory; and communicating a search query having the search parameters to the determined databases.

17. The software of claim 15 wherein the secondary content directories are personal to one or more users and are organized in a hierarchy satisfying one or more requirements for the users.

18. The software of claim 15 wherein a class pointer identifying a product class in the master global content directory also inherently identifies all product classes under the product classes in the hierarchy of the master global content directory.

19. The software of claim 15 wherein providing a plurality of users access to the master global content directory through one or more secondary content directories comprises determining access to the master global content directory by which product classes in the master global content directory are identified by class pointers associated with the product classes in a secondary content directory.

20. The software of claim 15, wherein one or more of the product pointers identify particular product data in one or more of the databases.

21. The software of claim 15, wherein the search query comprises desired values, specified by the user of one of the secondary content directories, for one or more of the product attributes associated with a selected product class.

22. A system for generating, updating, and managing multi-taxonomy environments in an electronic commerce transaction, the method comprising:

means for storing product data for one or more products;

means for categorizing the products in a master global content directory, the master global content directory coupled with the one or more sellers' databases and comprising a directory structure including a plurality of product classes organized in a hierarchy according to a first classification system, each product class categorizing a plurality of products and associated with one or more attributes of the products categorized in the product class, one or more of the product classes having one or more associated product pointers that identify one or more of the sellers' databases;

means for providing a plurality of users access to the master global content directory through one or more secondary content directories, the secondary content directories coupled with the master global content directory and comprising one or more product classes organized in a hierarchy according to a second classification system that is distinct from the first classification system of the master global content directory, each product class being mapped to one or more product classes in the master global content directory and having one or more associated class pointers that identify the one or more product classes in the master global content directory to which the product class is mapped;

means for receiving a selection of a product class of a secondary content directory from a user, the selected product class having at least one class pointer identifying at least one product class in the master global content directory; and in response to the selection of the product class by the user, means for communicating a search query to one or more sellers' databases to search product data stored in the sellers' databases identified by one or more of the product pointers to facilitate a commercial transaction involving one or more products.

\* \* \* \* \*